UNITED STATES PATENT OFFICE.

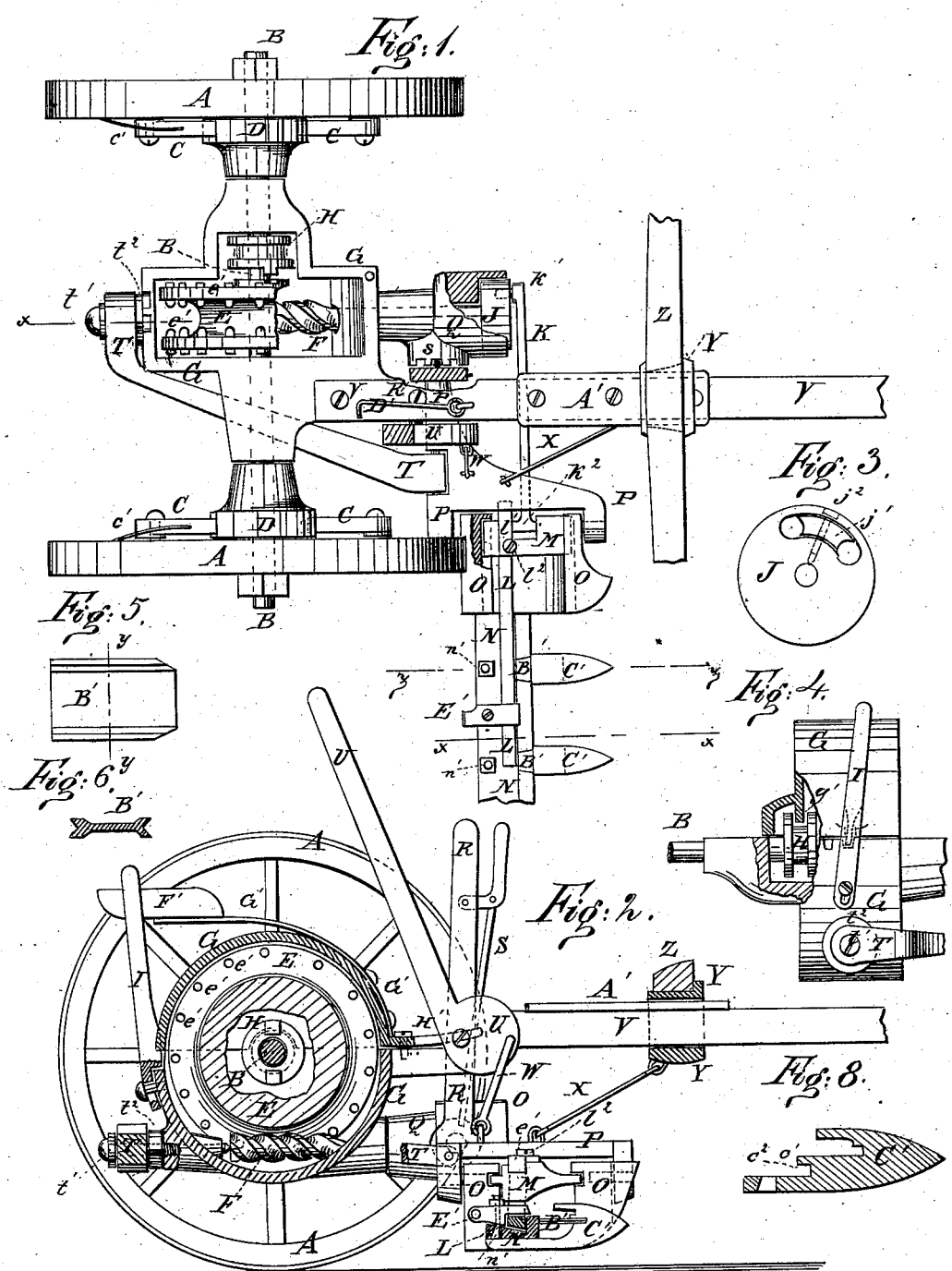

JOHN J. KNAPP, OF LEWISBURG, WEST VIRGINIA.

MOWER.

SPECIFICATION forming part of Letters Patent No. 228,082, dated May 25, 1880.

Application filed September 6, 1879.

*To all whom it may concern:*

Be it known that I, JOHN J. KNAPP, of Lewisburg, in the county of Greenbrier and State of West Virginia, have invented a new and useful Improvement in Mowers, of which the following is a specification.

Figure 1 is a top view of my improved machine, parts being broken away to show the construction. Fig. 2 is a section of the same, taken through the broken line $xxx$, Fig. 1. Fig. 3 is a detail view of the crank-wheel. Fig. 4 is a detail rear view of the case, part being broken away to show the clutch. Fig. 5 is a plan view of one of the stationary cutters. Fig. 6 is a cross-section of the same, taken through the line $y\,y$, Fig. 5. Fig. 7 is a detail side view of the inner end of the cutter-bar and its sliding block. Fig. 8 is a detail cross-section of the cutter-bar, taken through the line $z\,z$, Fig. 1.

Similar letters of reference indicate corresponding parts.

The object of this invention is to furnish mowers which shall be simple in construction and effective in operation, which may be easily adjusted and controlled, and will work with less wear and tear than mowers constructed in the usual way.

A A are the drive-wheels, which revolve upon the journals of the axle B. To the wheels A are pivoted pawls C, which are held down by springs $c'$ against the teeth of the ratchet-wheels D, attached to the axle B, so that the said wheels A may carry the said axle with them in their forward revolution, but may turn backward without turning the said axle, and so that one of the wheels A may turn faster in turning the machine without causing the other wheel to slide.

Upon the center of the axle B is placed a wheel, E, in the face of which is formed a ring-groove of such a depth and size as to receive within it the screw F, which revolves in bearings in the forward and rear lower parts of the case G. The case G has bearings formed upon the upper parts of the sides of its lower part, to receive the axle B, so that the said case G may be hung from the said axle. Upon the said axle B, in a recess or chamber of the case G, is placed a clutch, H, the teeth of which engage with clutch-teeth formed upon the side of the wheel E. In the clutch H is formed a ring-groove to receive a flange, $g'$, formed upon the upper part of the case G, so that the said clutch H may be thrown into and out of gear with the wheel E by moving the said upper part of the said case G laterally. The upper part of the case G is pivoted at its forward end to the forward end of the lower part by a screw or bolt, so that its rear end may be moved laterally to throw the clutch H into and out of gear with the wheel E by means of a lever, I, the lower end of which is slotted to receive the screw or bolt by which it is pivoted to the rear end of the lower part of the case G. The lever I enters a notch in the rear end of the upper part of the case G, so that the said upper part may be moved laterally by moving the lever I. The lever I is provided with a shoulder to enter one or the other of two notches formed in the upper edge of the rear end of the lower part of the case G, to lock the upper part of the said case G and the clutch H in either position.

Upon the inner sides of the flanges of the wheel E are attached inwardly-projecting pins $e'$ in such a way that the pins of the two flanges may alternate with each other, and in such a way that their inner ends may engage with the threads of the screw F upon the opposite sides of the said screw, to prevent any side pressure upon the screw. The screw F is made single, as shown in Figs. 1 and 2.

By this construction the screw F will be rotated by the advance of the machine.

To the forward end of the screw F is attached a crank-wheel, J, in which are formed two holes to receive the pin or hook $k'$, formed upon or attached to the inner end of the pitman K, so that when one of the said holes becomes worn the said pin $k'$ may be inserted in the other. The part of the wheel J between the two bearing-holes is cut away and is replaced by a block, $j'$, which is secured in place by a set-screw, $j^2$, passing in through the wheel J upon the outer and inner sides of the block $j'$, passing through the said block $j'$ and resting against the side of the forward end of the screw F, so as to serve also as a set-screw for securing the said crank-wheel to the said screw.

The pitman-rod K is bent at right angles at its outer end to form a hook. This hook bears upon its end a ball to fit in the socket formed by the bent cutter-bar and the sliding block M. The ball is kept in the socket by the bearing of the side of the end of pitman-rod at its angle against a projecting piece on the said block, as shown in the drawings.

The upper side of the sliding block M is grooved to receive the upper arm of the bend $l'$ of the sickle-bar L, where it is secured in place by a screw, $l^2$, which passes through the joint between the said arm and block, so as to be partly in each, and thus to key the two together. The sickle-bar L slides out and in upon the finger-bar N, the inner end of which is rigidly attached to the shoe O. The middle part of the shoe O is cut away to receive the inner end of the sickle-bar L and the guide-block M, and has grooves formed in it at the sides of the said recess to receive the tongues formed upon the forward and rear ends of the said block M, and serve as ways for the said block to slide in. The shoe O is hinged at its inner corners to lugs formed upon the bracket P, so that the outer end of the cutter-bar may have a vertical but no lateral movement. The inner end of the bracket or arm P is swiveled to a sleeve, Q, so that it may turn to allow the cutters to be adjusted closer to or farther from the ground, as may be desired. The sleeve Q is placed upon the projecting part of the forward bearing for the screw F, so that the inner end of the cutter-bar may be raised and lowered as may be required. To the inner part of the bracket P is rigidly attached the lower end of the lever R, so that the points of the cutters may be raised and lowered by operating the said lever R. The lever R is held in any position into which it may be adjusted by a spring-lever catch, S, attached to it, and which engages with notches in the adjacent part of the sleeve Q.

To the rear outer part of the bracket P is hinged the forward end of the bar T, the rear end of which is bent inward and is pivoted to the rear end of the case G by the screw $t'$. The bar T thus sustains the rearward pressure of the cutter and finger bars N L, and at the same time allows the said bars N L to be raised and lowered as may be required. The screw $t'$ passes in through the rear end of the case G and forms a pivot for the rear end of the screw F. The screw $t'$ is provided with a jam-nut, $t^2$, to keep it in place when adjusted. The outer end of the bracket P and the inner ends of the bars N L are raised and lowered as may be required by a lever, U, pivoted to the side of the tongue V, and connected with the outer part of the said bracket P by a jointed rod or chain, W.

To the outer part of the bracket P is attached the rear end of a jointed rod or chain, X, the forward end of which is attached to the sleeve Y, which slides upon the tongue V, and has the double-tree Z attached to its upper side. By this arrangement the draft will be applied directly to the cutting apparatus N L and bracket P.

To the upper side of that part of the tongue V upon which the sleeve Y slides is attached a plate, A', which is made a little wider than the said tongue V, so that its side edges may project to enter the grooves in the sleeve Y, and thus serve as guides to the said sleeve. The cavity of the sleeve Y is made narrower at its rear end and wider at its forward end, to allow its forward end to have a slight lateral play upon the tongue V and plate A'.

B' B' are the stationary cutters, which are secured in recesses in the finger-bar N, and in the fingers C attached to the said finger-bar N. The stationary cutters B' have their forward corners slightly beveled or rounded off, and have their side edges thickened and a V-groove formed in them longitudinally, as shown in Figs. 5 and 6, to form the cutting-edges.

With this construction, when the upper edges become dull the cutters B' can be inverted and the other edges used; and when both edges become dull the cutters can be readily sharpened without making their edges thinner, and thus leaving a space between the said edges and the movable cutters. The movable cutters are not shown in the drawings. The lower arms of the fingers C' cross the lower side of the finger-bar N, to serve as shoes.

Upon the forward part of the lower arm of the fingers C' is formed a shoulder, $c'$, which should be slightly tapered to fit into a slightly-tapered notch formed to receive it in the turned-up forward edge of the finger-bar N; and in the lower part of the shoulder $c'$ is formed a notch, $c^2$, to receive the forward edge of the body of the said finger-bar N. The rear end of the cutters B' is tapered to fit into the upper part of the tapered notch in the finger-bar N.

The fingers C' and the cutters B' are secured to the finger-bar N by bolts $n'$, which pass up through the lower arm of the said fingers and through the said finger-bar, and are made wedge-shaped, so as to firmly draw the said fingers and cutters to their places.

When the cutting apparatus N L is turned up into a vertical position it is secured in place by a hook, D', pivoted to the tongue V, which hooks into an eye, E', formed upon or attached to the finger-bar N.

F' is the driver's seat, which is attached to the upper end of the spring-standard G'. The lower part of the standard passes down along, is curved to fit upon, and is secured to the forward end of the upper or movable part of the case G.

To the forward end of the upper or movable part of the case G is attached, or upon it is formed, the rest H' for the driver's feet.

Having thus fully described my invention, I claim as new and desire to secure by Letters Patent—

1. The crank-wheel J, provided with the two bearing-holes, the detachable block $j'$, and the set-screw $j^2$, to allow the pitman to be changed when one of the bearing-holes becomes worn, substantially as herein shown and described.

2. The finger-bar N, turned up over and backward on the slide-block, and forming a socket for ball end of pitman, as shown and described.

3. The combination of the screw $l^2$ with the bent inner end of the sickle-bar L and the sliding block M, substantially as herein shown and described.

JOHN J. KNAPP.

Witnesses:
G. W. KNAPP,
JOHN A. KNAPP.